(12) United States Patent
Ye et al.

(10) Patent No.: US 8,276,864 B2
(45) Date of Patent: Oct. 2, 2012

(54) MOUNTING BRACKET FOR DISPLAY

(75) Inventors: Zhen-Xing Ye, Shenzhen (CN);
Chia-Shin Chou, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 129 days.

(21) Appl. No.: 12/870,623

(22) Filed: Aug. 27, 2010

(65) Prior Publication Data

US 2011/0260026 A1 Oct. 27, 2011

(30) Foreign Application Priority Data

Apr. 23, 2010 (CN) .......................... 2010 1 0154043

(51) Int. Cl.
*E04G 3/00* (2006.01)

(52) U.S. Cl. ................ 248/287.1; 248/295.11; 248/924; 361/679.21

(58) Field of Classification Search ............. 361/679.01, 361/679.02, 679.21; 248/919, 920, 924, 248/917, 923, 448, 279.1, 287.1, 229.15, 248/229.25, 228.6, 230.6, 231.71, 231.85, 248/295.11, 285.1, 222.11, 222.13, 222.51; 40/658, 611.12; 52/36.4, 653.1

See application file for complete search history.

(56) References Cited

U.S. PATENT DOCUMENTS

| | | | | |
|---|---|---|---|---|
| 2,541,434 A * | 2/1951 | Nelson et al. ................. 248/210 |
| 4,448,384 A * | 5/1984 | Jones et al. ................... 248/443 |
| 4,549,713 A * | 10/1985 | Magadini ...................... 248/495 |
| 5,069,411 A * | 12/1991 | Murphy ........................ 248/476 |
| 5,400,993 A * | 3/1995 | Hamilton ..................... 248/279.1 |
| 5,857,577 A * | 1/1999 | Thomas et al. ............. 211/94.01 |
| 5,944,896 A * | 8/1999 | Landesman et al. .......... 118/500 |
| 6,024,348 A * | 2/2000 | Ventura et al. ................. 269/17 |
| 6,402,111 B1 * | 6/2002 | Stewart et al. ............... 248/317 |
| 6,581,887 B2 * | 6/2003 | Lapidez ..................... 248/122.1 |
| 7,172,166 B2 * | 2/2007 | Wang .......................... 248/317 |
| 7,195,213 B2 * | 3/2007 | Weatherly .................. 248/125.1 |
| 7,300,029 B2 * | 11/2007 | Petrick et al. .............. 248/285.1 |
| 7,380,766 B2 * | 6/2008 | Thompson .................... 248/449 |
| 7,448,584 B2 * | 11/2008 | Chen et al. ................. 248/278.1 |
| 7,448,606 B1 * | 11/2008 | Johnson ......................... 269/17 |
| 7,854,415 B2 * | 12/2010 | Holbrook et al. .......... 248/125.2 |
| 7,869,192 B2 * | 1/2011 | Jacobsen et al. ............. 361/605 |
| 7,918,428 B2 * | 4/2011 | Kim et al. ................. 248/295.11 |
| 8,069,598 B2 * | 12/2011 | Garcia et al. ................... 40/601 |
| 8,070,121 B2 * | 12/2011 | Dozier et al. ............... 248/294.1 |
| 2004/0188573 A1 * | 9/2004 | Weatherly .................. 248/125.1 |
| 2005/0045795 A1 * | 3/2005 | Thompson .................... 248/448 |
| 2008/0151483 A1 * | 6/2008 | Holbrook et al. ............. 361/681 |
| 2010/0067185 A1 * | 3/2010 | Liou ........................ 361/679.21 |

\* cited by examiner

*Primary Examiner* — Bradley Duckworth
*Assistant Examiner* — Erin W Smith
(74) *Attorney, Agent, or Firm* — Altis Law Group, Inc.

(57) ABSTRACT

A mounting bracket for a display includes a first rail and a first clamping mechanism. The first clamping mechanism is slidably mounted to the rail along a first direction. The clamping mechanism includes a first and a second clamping members. The first and second clamping members are telescopically mounted to each other along a second direction, which is substantially perpendicular to the first direction. Each of the first and second clamping member includes a clamp assembly. Each clamp assembly extends along a third direction that is substantially perpendicular to the first direction and the second direction. The two clamp assemblies can cooperatively clamp the display.

19 Claims, 7 Drawing Sheets

MOUNTING BRACKET FOR DISPLAY

BACKGROUND

1. Technical Field

The present disclosure relates to mounting brackets for displays, in particularly to an adjustable mounting bracket for a display.

2. Description of Related Art

Flat displays or flat televisions can be hung on a wall with a bracket. However, typically, a height or horizontal position of the display cannot be adjusted after being fixed to the wall. In addition, if the user wants to change a display with different sizes, the bracket must be unfixed and changed. It is inconvenient for the user to watch the display in a still position or to always change the display to a different position.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
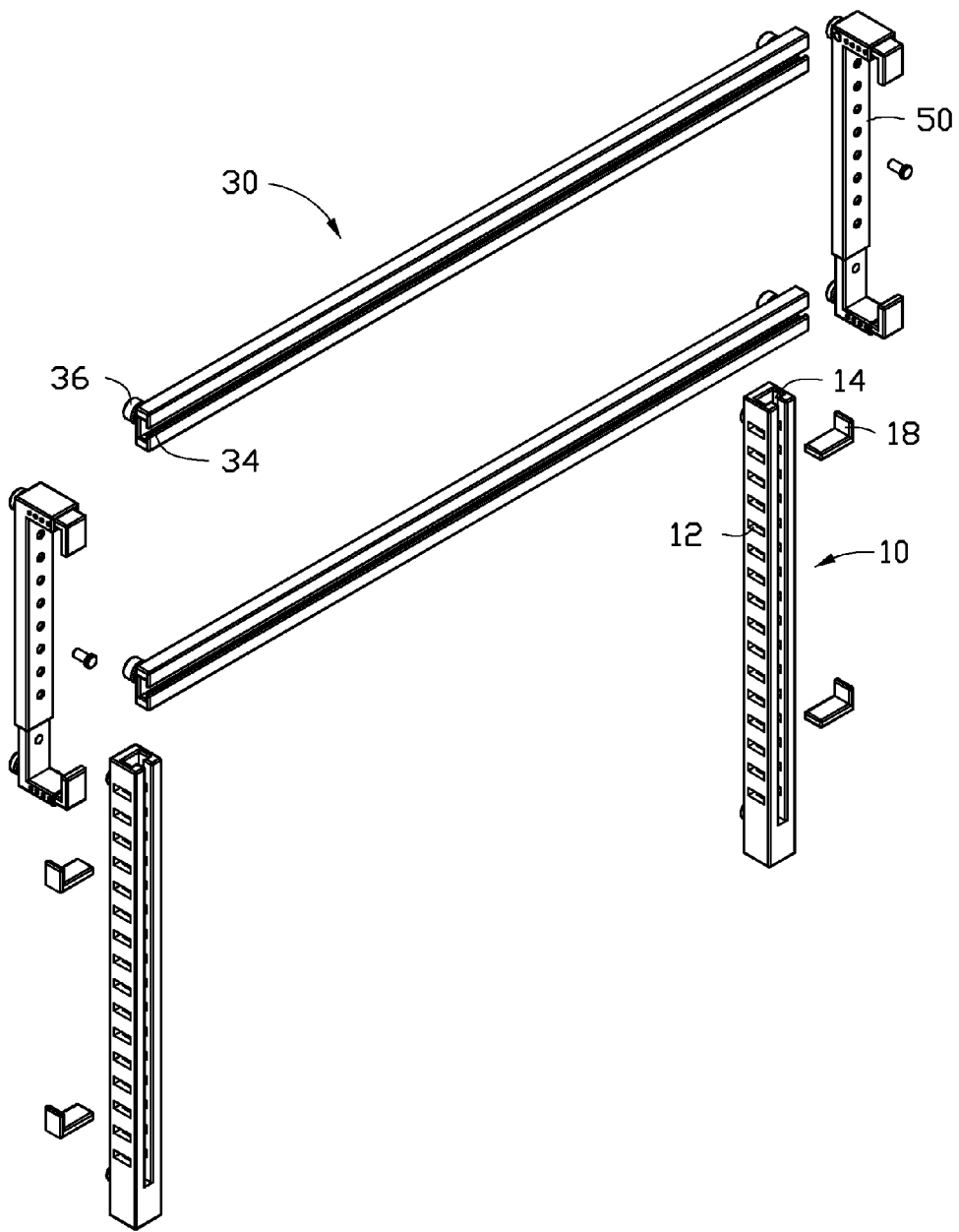
FIG. 1 is an exploded, isometric view of an embodiment of a mounting bracket.
Figure 2:
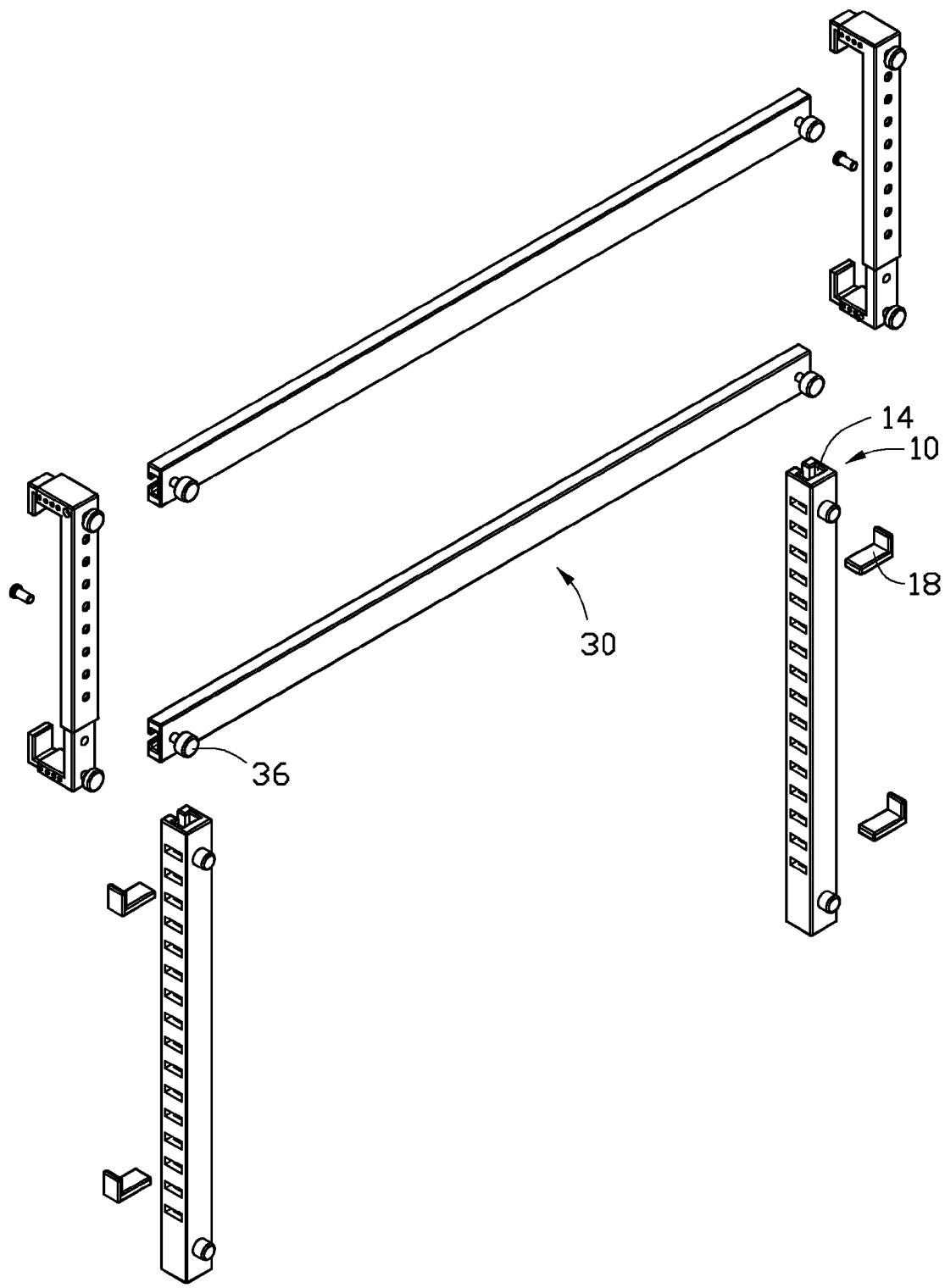
FIG. 2 is similar to FIG. 1, but shown from another aspect.
Figure 7:
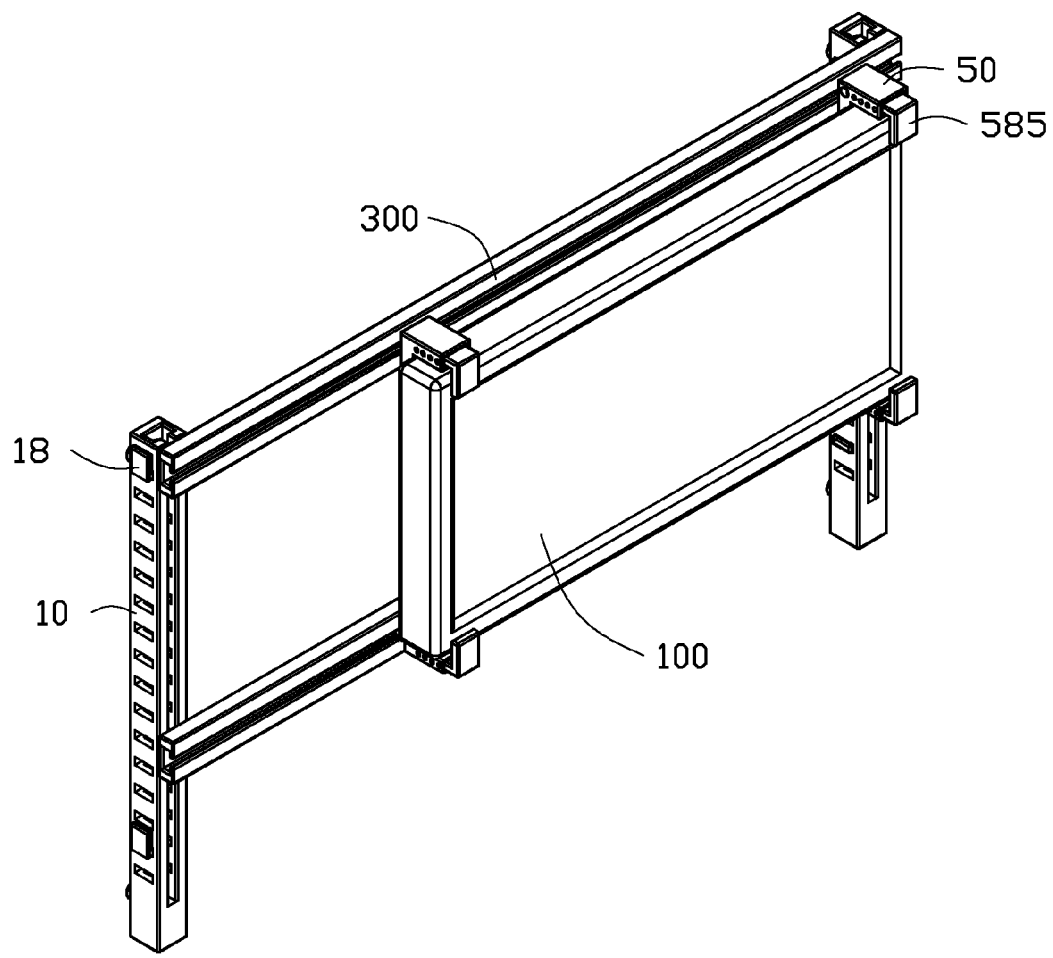
FIG. 7 is an assembled view of a display and the mounting bracket of FIG. 1.

Referring to FIG. 1, FIG. 2 and FIG. 7, one embodiment of a mounting bracket is used for mounting a display 100. The display 100 may be a flat display. The mounting bracket includes two substantially parallel support bars 10, two substantially parallel rails 30 and two clamping mechanisms 50.

The rails 30 are slidably mounted to the support bars 10 along an extension direction of the support bars 10 and the clamping mechanisms 50 are slidably mounted to the support bars 10 along a first direction of the rails 30.

A substantially C-shaped guide channel 14 is defined in each support bar 10 for guiding the rails 30. A number of equally spaced through holes 12 is defined in each support bar 10. The through holes 12 are aligned in the extension direction of the support bar 10. Each support bar 10 includes a substantially L-shaped positioning block 18. The positioning block 18 can be inserted to traverse the guide channel 14 of each support bar 10 for supporting the rails 30.

The rails 30 are positioned substantially perpendicular to the support bars 10. Each rail 30 has two mounting tabs 36, and each mounting tab 36 corresponds to one support bar 10. The mounting tabs 36 can be guided into the corresponding guide channel 14 of the support bar 10. A substantially C-shaped guide groove 34 is defined in each rail 30 along the first direction of the rails 30 for receiving the clamping mechanisms 50.

Figure 3:
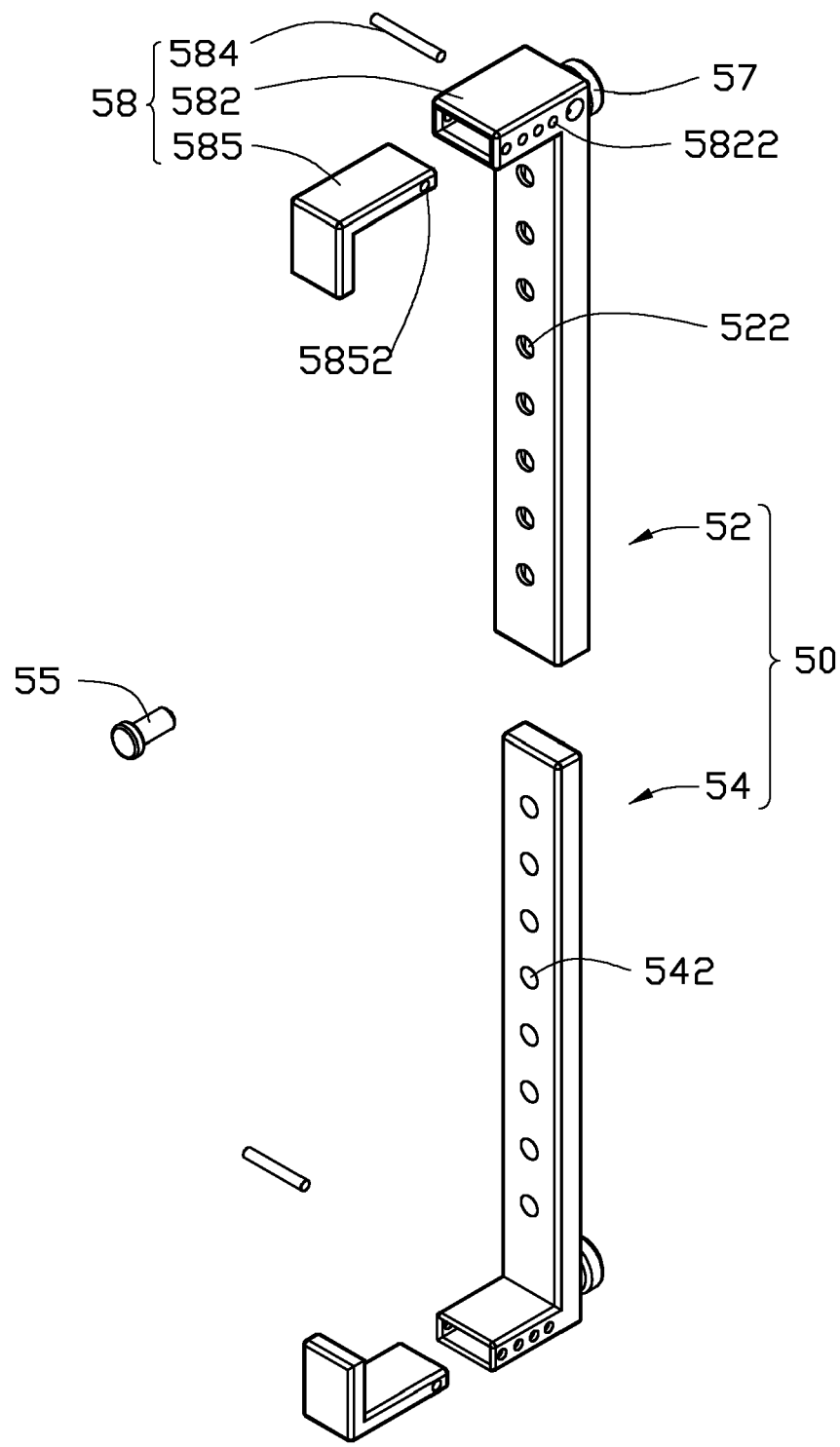
FIG. 3 is an exploded view of clamping mechanism of FIG. 1.
Figure 4:
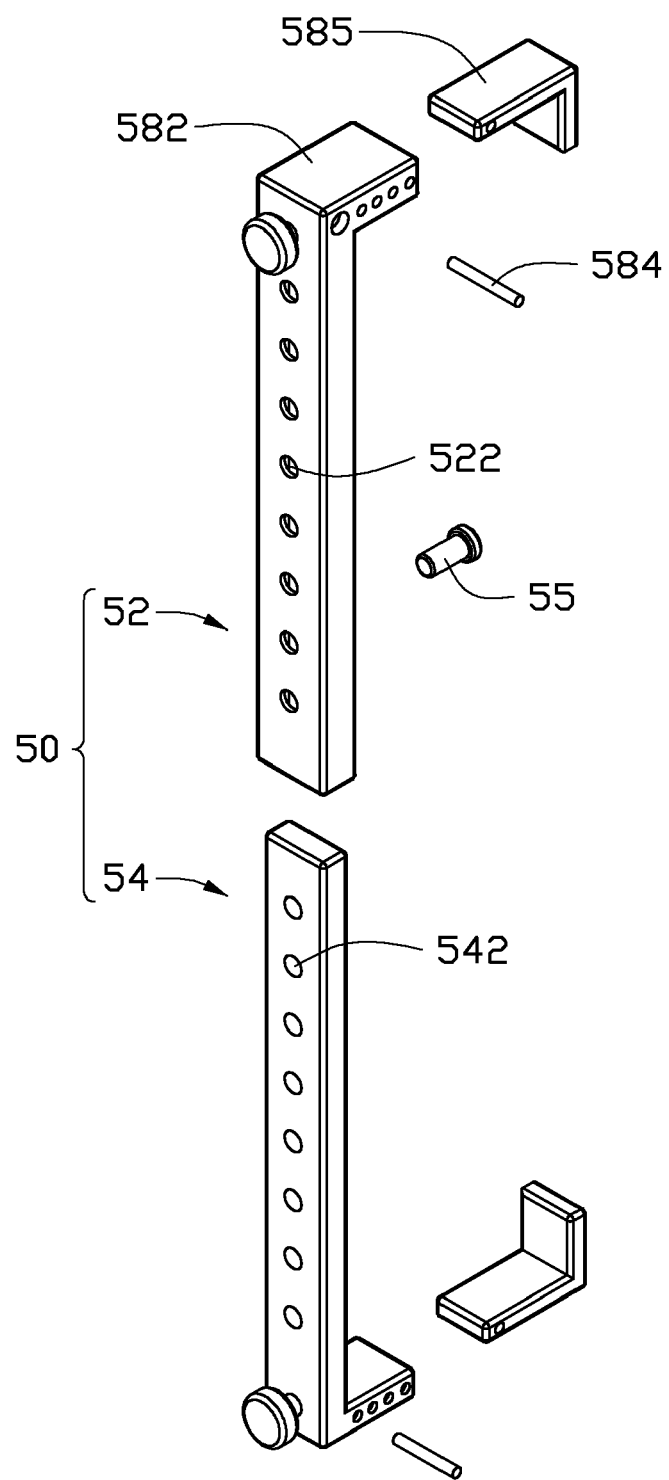
FIG. 4 is similar to FIG. 3, but shown from another aspect.

Referring to FIG. 3 and FIG. 4, the clamping mechanisms 50 have substantially the same structure. Each clamping mechanism 50 includes a first clamping member 52 and a second clamping member 54. The first clamping member 52 and the second clamping member 54 are telescopically mounted. An extension direction of the first clamping member 52 and the second clamping member 54 is substantially perpendicular to the rails 30. The first clamping member 52 includes a clamp assembly 58 and a sliding tab 57. The clamp assembly 58 includes a receiving chamber 582, a substantially L-shaped clamp 585, and a positioning pin 584 for retaining the clamp 585 to the receiving chamber 582. A number of spaced first mounting holes 5822 are aligned in the receiving chamber 582. A second mounting hole 5852 is defined in the receiving chamber 582 corresponding to one of the first mounting holes 5822. The sliding tab 57 can slide in the guide groove 34 of the rail 30. The second clamping member 54 includes a clamp assembly (not labeled) which has substantially the same structure as the clamp assembly 58. The second clamping member 54 can cooperate with the clamp portion 58 to clamp the display 100 to a sliding tab (not labeled) which has substantially the same structure as the sliding tab 57. A number of spaced first retaining holes 522 are defined in the first clamping member 52, and a number of spaced second retaining holes 542 are defined in the second clamping member 54. The first retaining holes 522 and the second retaining holes 542 are aligned in the extension direction of the first clamping member 52 and the second clamping member 54. The clamping mechanism 50 further includes a post 55 that extends into the first and the second clamping members 52, 54, thus securing both clamping members 52, 54.

Figure 5:
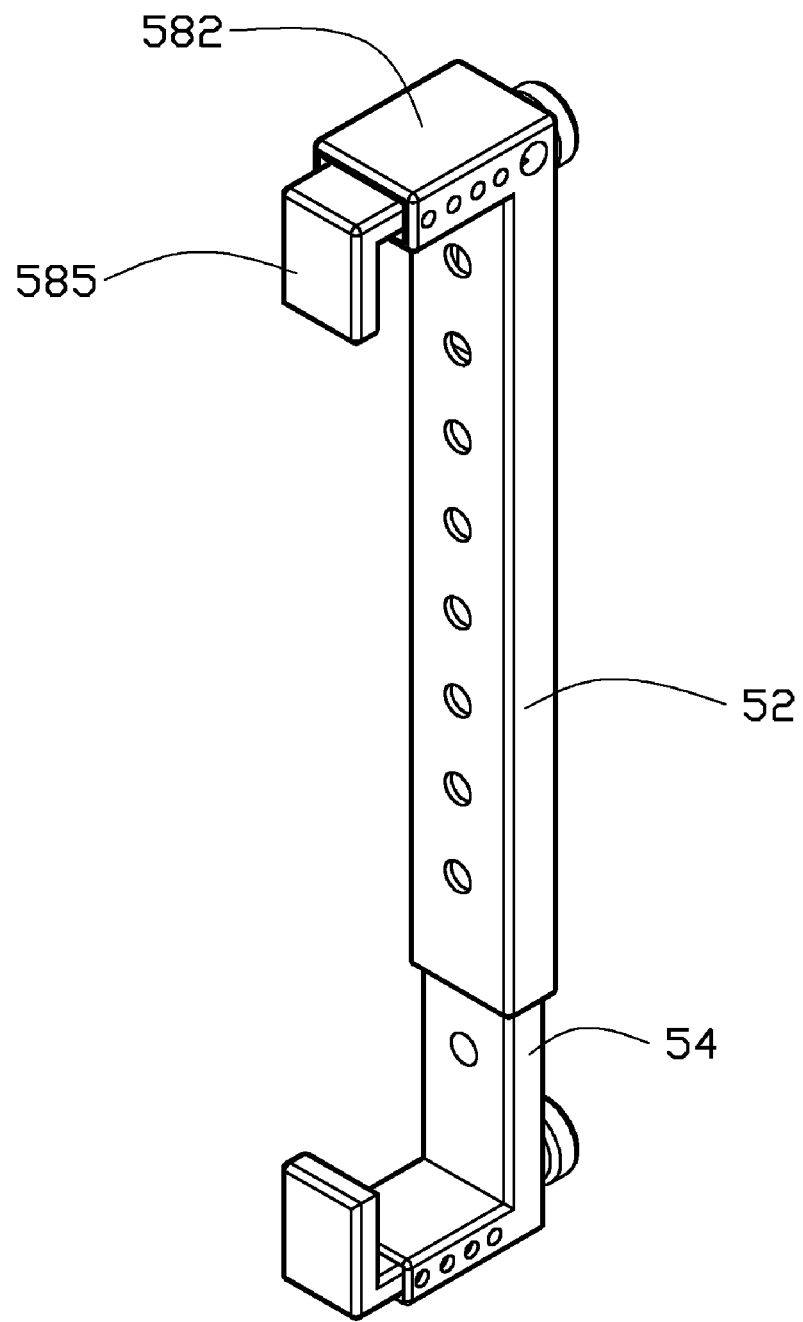
FIG. 5 is an assembled view of FIG. 3.

Referring to FIG. 5, the first clamping member 52 and the second clamping member 54 are telescopically mounted to each other. The first retaining holes 522 and the second retaining holes 542 are aligned, and the post 55 extends into the aligned first retaining hole 522 and the second retaining hole 542. The first retaining holes 522 and the second retaining holes 542 can be aligned in different ways so the post 55 can retain the first clamping member 52 and the second clamping member 54 in different extension positions. In the same way, the positioning pin 584 extends into the aligned first mounting hole 5822 and second mounting hole 5852 to mount the clamp assembly 58. The clamp assembly of the second clamping member 54 is mounted in the same way.

Figure 6:
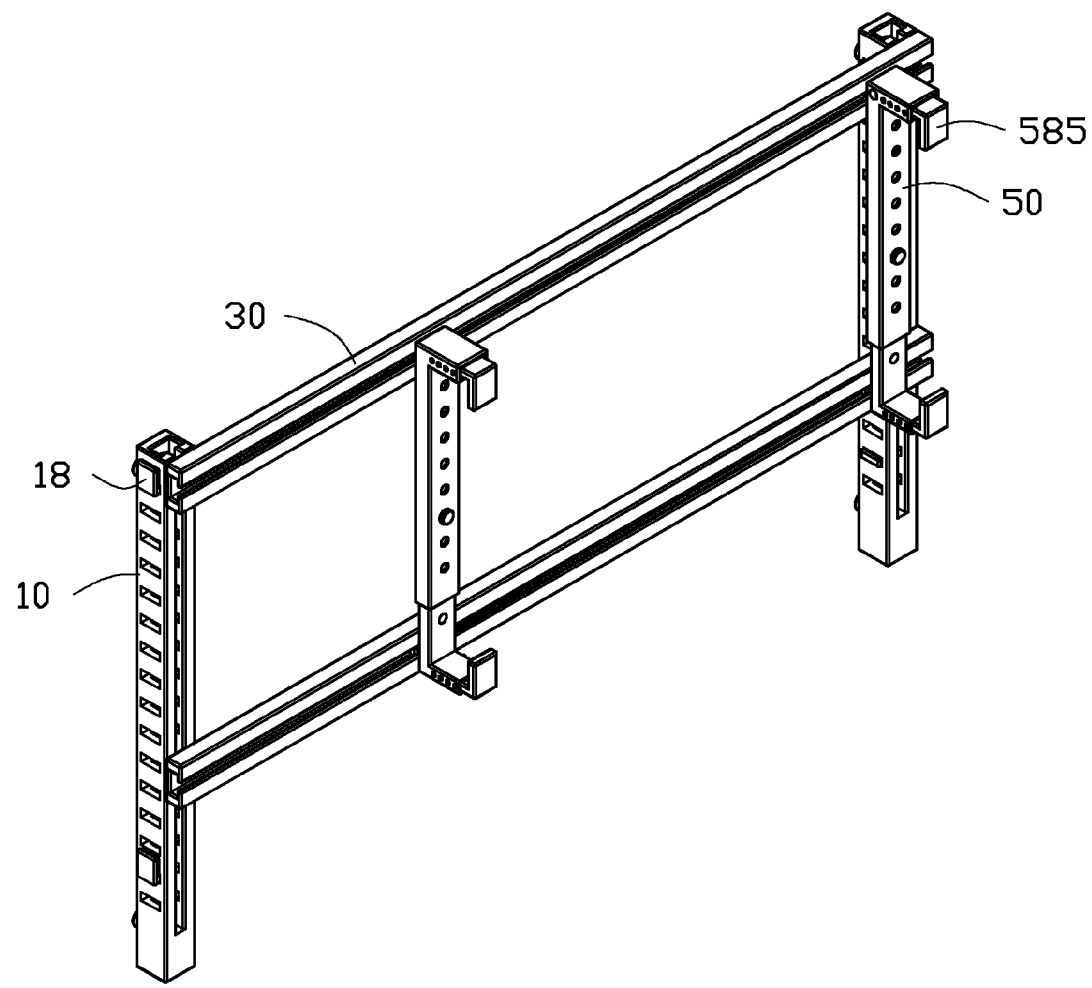
FIG. 6 is an assembled view of FIG. 1.

Referring to FIG. 6 and FIG. 7, the mounting tabs 36 of the rails 30 are respectively slid into the corresponding guide channel 14 of the support bar 10. The positioning block 18 extends into one of the through holes 12 to support the mounting tabs 36. The sliding tabs 57 of the clamping mechanisms 50 are respectively slid into the corresponding guide groove 34 of the rails 30. The display 100 then can be cooperatively clamped by the clamping mechanisms 50.

Positions of the mounting bracket can be adjusted and the mounting bracket can retain a display with different size and thickness.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting bracket for a display comprising:
a first rail; and
a first clamping mechanism slidably mounted to the first rail along a first direction, the first clamping mechanism comprising a first and a second clamping member, the first and second clamping members telescopically mounted to each other along a second direction, which is substantially perpendicular to the first direction, each of the first and second clamping members comprise a clamp assembly, each clamp assembly extends along a third direction that is substantially perpendicular to the first direction and the second direction, each clamp assembly comprising a clamp and a receiving chamber, and each clamp telescopically mounted to the each receiving chamber, wherein the two clamp assemblies are capable of cooperatively clamping the display.

2. The mounting bracket of claim 1, wherein the mounting bracket further comprises two substantially parallel support bars, and the first rail is slidably mounted to the two substantially parallel support bars along the second direction.

3. The mounting bracket of claim 2, wherein the mounting bracket further comprising a second rail slidably mounted to the two substantially parallel support bars along the second direction to cooperatively support the first clamping mechanism.

4. The mounting bracket of claim 2, wherein a sliding tab is located on the first rail, and a guide channel is defined in each support bar for receiving the sliding tab.

5. The mounting bracket of claim 4, wherein a positioning block is received in the guide channel to support the first rail, and a plurality of through holes, aligned along the second direction, is defined in each support bar for receiving the positioning block.

6. The mounting bracket of claim 1, wherein a plurality of first retaining holes aligned in the second direction is defined in the first clamping member, at least one second retaining hole is defined in the second clamping member, and the first clamping mechanism further comprises a positioning post for positioning the first and second clamping members through the one of the first retaining holes and one of the second retaining holes.

7. The mounting bracket of claim 1, wherein each clamp is substantially L-shaped.

8. The mounting bracket of claim 7, wherein a plurality of first mounting holes is defined in the receiving chamber is aligned in the third direction and a second mounting hole is defined in the clamp to align with one of the first mounting holes of the receiving chamber.

9. The mounting bracket of claim 1, wherein a guide groove, extending along the first direction, is defined in the first rail for receiving the first clamping mechanism.

10. The mounting bracket of claim 1, wherein the mounting bracket further comprises a second clamping mechanism slidably mounted to the first rail for cooperatively fixing the display.

11. A mounting bracket for a display comprising:
two substantially parallel rails; and
a first clamping mechanism slidably mounted to the two substantially parallel rails along a first direction, the first clamping mechanism comprising a first and a second clamping members; the first and second clamping members are telescopically mounted to each other along a second direction, which is substantially perpendicular to the first direction; and each of the first and second clamping member comprising a clamp assembly, and the clamp assembly extending along a third direction that is substantially perpendicular to the first direction and the second direction, wherein each of the first and second clamping member is slidably mounted to one of the two substantially parallel rails and the two clamp assemblies being capable of cooperatively clamp the display.

12. The mounting bracket of claim 11, wherein the mounting bracket further comprises two substantially parallel support bars, and the two substantially parallel rails are slidably mounted to the two substantially parallel support bars along the second direction.

13. The mounting bracket of claim 12, wherein a sliding tab is located on each of the two substantially parallel rails, and a guide channel is defined in each of the two substantially parallel support bars for receiving the sliding tab.

14. The mounting bracket of claim 13, wherein a positioning block is received in the guide channel to support the two substantially parallel rails, and a plurality of through holes aligned along the second direction is defined in each of the two substantially parallel support bars for receiving the positioning block.

15. The mounting bracket of claim 11, wherein a plurality of first retaining holes aligned in the second direction is defined in the first clamping member, at least one retaining hole is defined in the second clamping member, and the first clamping mechanism further comprises a positioning post for positioning the first and second clamping members through one of the first retaining holes and one of the second retaining holes.

16. The mounting bracket of claim 11, wherein the each clamping assembly comprises a clamp, and each clamp is substantially L-shaped.

17. The mounting bracket of claim 16, wherein each clamping assembly further comprises a receiving chamber for receiving the clamp, and a plurality of first mounting holes is defined in the receiving chamber is aligned in the third direction, and a second mounting hole is defined in the clamp to align with one of the first mounting holes of the receiving chamber.

18. The mounting bracket of claim 11, wherein a guide groove, extending along the first direction, is defined in each of the two substantially parallel rails for receiving the first clamping mechanism.

19. The mounting bracket of claim 11, wherein the mounting bracket further comprises a second clamping mechanism slidably mounted to the two substantially parallel rails for cooperatively fixing the display.

* * * * *